Oct. 6, 1953
R. DOUCOT
2,654,700
APPARATUS FOR METALS DISTILLATION
Filed Dec. 29, 1949
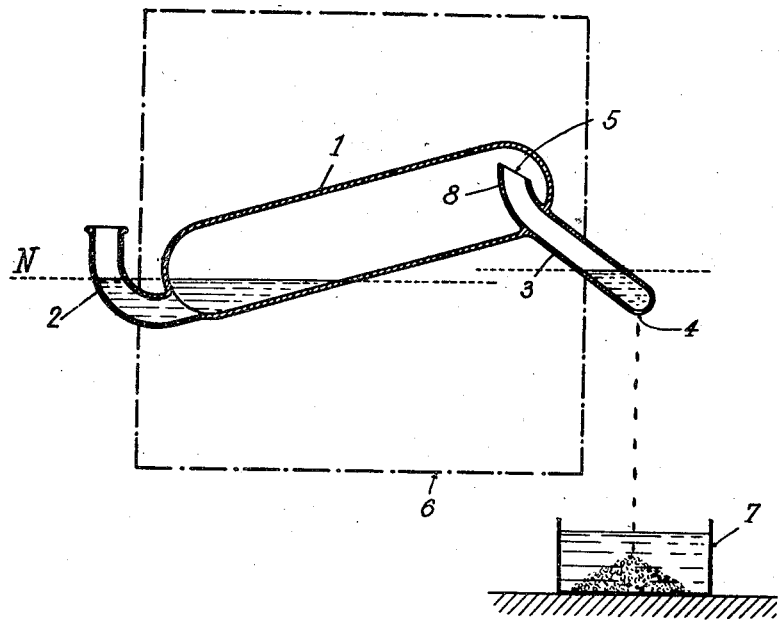
INVENTOR:
ROGER DOUCOT
BY Theodore Hafner
ATTORNEY Patented Oct. 6, 1953

2,654,700

UNITED STATES PATENT OFFICE 2,654,700

APPARATUS FOR METALS DISTILLATION

Roger Doucot, Ivry, France, assignor to Compagnie des Freins & Signaux Westinghouse, Paris, France Application October 29, 1949, Serial No. 124,456
In France November 10, 1948

2 Claims. (Cl. 202—189)

This invention relates to the purification of selenium and other similar materials.

It is known that for certain applications, particularly in the manufacture of current rectifiers, photo-electric cells and other asymmetrical conductive devices, it is necessary to employ particularly highly purified selenium.

It is an object of the invention to provide a method and an apparatus whereby selenium and similar substances permit purification without incurring any risk of contamination.

The method according to the invention consists essentially of distilling the selenium (or other similar products) to be purified in a retort closed at both ends by liquid seals of selenium or other similar material (one seal being the impure product to be purified and the other seal being the condensed pure product), collecting the purified product in a container having distilled water therein, and finally drying the small globules or particles thus formed in a dryer of invariant material.

The purifying machine, according to the invention, consists of a retort (preferably of borosilicate glass such as the product known under the trade name of "Pyrex," quartz or invariant metal). The lower end of this retort is provided with a tubular member containing the product to be purified and forming a liquid seal. The upper end of the retort is provided with another tubular member, at the end of which the purified product condenses and which represents an outflow orifice. This orifice is of small dimension to prevent a complete outflow of the product, thus forming a liquid seal at the other end of the retort.

Still in accordance with the invention, the outflow tube mentioned above extends inside the retort, and its internal aperture is positioned substantially in front of the upper end wall of the retort to avoid any direct projections of the liquid product, not yet purified, into the outflow tube.

In the single figure of the drawing annexed hereto, there is shown diagrammatically and by way of example only, an embodiment of a purifying apparatus according to the invention.

Referring now to the drawing, the apparatus comprises a retort 1 of invariant material adapted to be heated, for instance borosilicate glass (such as known under the trade name of Pyrex, or quartz of invariant metal). Retort 1 is provided at its lower end with a U-shaped inlet tube 2, and, at its upper end, with another tube 3, the upper end of which extends into and opens inside retort 1. The lower end of tube 3 has an orifice 4 of relatively small dimension, so calculated that the outflow of the selenium condensed in tube 3 is retarded to permit a liquid seal to be formed at this lower end of tube 3.

As will also be apparent from the drawing, the upper end of tube 3 has an inlet opening 5 facing substantially the end wall of the upper portion of retort 1, for reasons which will be made clear further below.

Retort 1 is placed inside an enclosure 6 shown only very schematically in point dotted lines. Enclosure 6 permits only a portion of inlet tube 2 and the outlet end of outflow tube 3 to project to the outside. Enclosure 6 is adapted to be heated to a temperature slightly above the distillation temperature of the product treated, at the pressure under consideration.

A container 7 of distilled water is placed beneath outflow tube orifice 4 wherein the purified product condenses and solidifies in the form of small globules or particles.

The apparatus described above operates as follows:

The selenium to be purified is fed in liquid state through tube 2 in such manner that its level attains the surface formed by dotted line N inside retort 1. Thus at the inlet of retort 1 a liquid seal is formed.

Then enclosure 6 is heated to a temperature slightly above the distillation temperature of selenium at the pressure under consideration.

Under the influence of the heat, the selenium boils inside retort 2 and distills into tube 3, where it condenses in that portion of tube 3 which is outside the heated enclosure 6. Due to the relatively small diameter of orifice 4 of tube 3, the distilled selenium will accumulate in tube 3, thus forming an air-tight seal. On the other hand, the orientation of inner aperture 5 of outflow tube 3 will prevent any direct projection of non-purified liquid selenium into tube 3 containing selenium already distilled. Portion 8 of tube 3 forms a shield against such projections.

The selenium flows slowly through orifice 4 into container 7 filled with perfectly pure distilled water. There, consequently, it very quickly solidifies to its amorphous form, in small globules which are particularly easy to handle when subjected to subsequent operations to be later used for the manufacture of current rectifiers, photo-electric cells, or other asymmetrical conductive devices.

When the amount distilled is deemed sufficient and the outflow of the purified condensed selenium is terminated, the selenium solidified in container 7 is dried. For this purpose the globules are fed into a dryer machine constructed of invariant materials such as enameled sheet metal or stainless steel.

The apparatus according to the invention may also be utilized for distillation under reduced pressure. In this case, the upper outer orifice of inlet tube 2 is plugged, for instance, by means of a stopper or cork provided for this purpose over tube 2, and the apparatus is connected to a suitable exhausting device.

If desired, the apparatus may be used in a similar manner in combination with a system for supplying a controlled atmosphere, such system being associated with the aforesaid exhausting device.

It is well understood that the apparatus, which has been described above as particularly convenient for the purification of selenium, may also be utilized for the purification of other similar products.

I claim:

1. In an apparatus for purifying a solid semiconductive substance, an inclined distillation retort, an inlet tube connected to the lower portion of said distillation retort and extending upwardly therefrom to form a seal, an inclined discharge tube extending into the upper end of the retort, said discharge tube having an open end forming an inlet opening inside the retort and a lower portion which is closed except for a small orifice, said orifice being of a size to prevent the discharge except on accumulation of a head of condensed material, and means for heating the lower portion of the retort.

2. In an apparatus as defined in claim 1 wherein said tubular outlet member has an extension inside said retort, the inner aperture of which faces substantially the upper end wall of said enclosure so as to prevent any direct projection into said aperture of non-purified liquid substance.

DOUCOT, ROGER.

References Cited in the file of this patent

UNITED STATES PATENTS

| Number | Name | Date |
|---|---|---|
| 1,076,410 | Dunnam | Oct. 21, 1913 |
| 2,028,481 | Tucker et al. | Jan. 21, 1936 |
| 2,406,421 | Wollner et al. | Aug. 27, 1946 |
| 2,414,295 | Gardiner | Jan. 14, 1947 |
| 2,450,098 | Smith | Sept. 28, 1948 |

OTHER REFERENCES

Industrial and Engineering Chemistry, Analytical Edition, vol. 6, No. 4, July 15, 1934, pages 274–276 (particularly Fig. 1, page 275), "Determination of Selenium and Arsenic by Distillation," by W. O. Robinson et al.

Morton: "Laboratory Technique in Organic Chemistry," McGraw-Hill Book Company, New York and London, 1938, page 84.

Liebig: "Still with Automatic Float Feed," Ind. and Eng. Chem., Analyt. Edition, vol. 12, 1940, page 174.

Kipnis: "Reflex-Distillation Adapter," Industrial and Engineering Chem., Analytical Chemistry Edition, vol. 19, 1947, page 934.